(12) United States Patent
Zhang

(10) Patent No.: US 10,767,581 B2
(45) Date of Patent: Sep. 8, 2020

(54) METHOD FOR OPERATING AN INTERNAL COMBUSTION ENGINE FOR A MOTOR VEHICLE, AND A SYSTEM FOR AN INTERNAL COMBUSTION ENGINE

(71) Applicant: CONTINENTAL AUTOMOTIVE GMBH, Hannover (DE)

(72) Inventor: Hong Zhang, Tegernheim (DE)

(73) Assignee: Vitesco Technologies GmbH, Hannover, MI (US)

( * ) Notice: Subject to any disclaimer, the term of this patent is extended or adjusted under 35 U.S.C. 154(b) by 94 days.

(21) Appl. No.: 15/939,840

(22) Filed: Mar. 29, 2018

(65) Prior Publication Data

US 2018/0223752 A1 Aug. 9, 2018

Related U.S. Application Data

(63) Continuation of application No. PCT/EP2016/072123, filed on Sep. 19, 2016.

(30) Foreign Application Priority Data

Oct. 2, 2015 (DE) .................. 10 2015 219 133

(51) Int. Cl.
*F02D 41/00* (2006.01)
*F02D 35/02* (2006.01)
(Continued)

(52) U.S. Cl.
CPC ....... *F02D 41/0052* (2013.01); *F02D 35/023* (2013.01); *F02D 35/027* (2013.01);
(Continued)

(58) Field of Classification Search
CPC ............ F02D 41/0052; F02D 41/0072; F02D 35/027; F02D 35/023; F02D 41/18;
(Continued)

(56) References Cited

U.S. PATENT DOCUMENTS 4,531,499 A * 7/1985 Eckert .................. F02D 35/023
123/435
5,592,919 A * 1/1997 Morikawa ............. F02D 35/023
123/435

(Continued)

FOREIGN PATENT DOCUMENTS

CN 101418745 A 4/2009
CN 104603432 A 5/2015
(Continued)

OTHER PUBLICATIONS

International Search Report and Written Opinion dated Dec. 22, 2016 from corresponding International Patent Application No. PCT/EP2016/072123.

(Continued)

*Primary Examiner* — Hung Q Nguyen
*Assistant Examiner* — Susan E Scharpf

(57) ABSTRACT

A method for operating an internal combustion engine for a motor vehicle including receiving measurement signals of a cylinder pressure sensor and determining cylinder pressure fluctuations as a function of the received measurement signals of the cylinder pressure sensor. The method also includes increasing an exhaust gas recirculation rate of the internal combustion engine as a function of the determined cylinder pressure fluctuations until a predefined limiting value of the cylinder pressure fluctuations is reached. In addition, the method includes determining an actual value of the exhaust gas recirculation rate if the predefined limiting value of the cylinder pressure fluctuations is reached, and storing the determined actual value as a setpoint value for the exhaust gas recirculation rate of the internal combustion engine.

14 Claims, 3 Drawing Sheets

(51) Int. Cl.
*F02D 41/24* (2006.01)
*F02P 5/04* (2006.01)
*F02P 5/15* (2006.01)
*F02D 41/28* (2006.01)
*F02D 41/18* (2006.01)

(52) U.S. Cl.
CPC ..... *F02D 41/0072* (2013.01); *F02D 41/2441* (2013.01); *F02P 5/045* (2013.01); *F02P 5/1516* (2013.01); *F02D 35/028* (2013.01); *F02D 41/18* (2013.01); *F02D 41/2429* (2013.01); *F02D 2041/286* (2013.01); *Y02T 10/47* (2013.01)

(58) Field of Classification Search
CPC ........... F02D 41/2441; F02D 2041/286; F02D 35/028; F02D 41/2429; F02P 5/1516; F02P 5/045; Y02T 10/47
See application file for complete search history.

(56) References Cited

U.S. PATENT DOCUMENTS

| | | | | |
|---|---|---|---|---|
| 5,636,614 A * | 6/1997 | Morikawa | ............. | F02D 35/023 123/435 |
| 5,664,544 A * | 9/1997 | Tomisawa | ............. | F02D 35/023 123/406.42 |
| 5,715,794 A * | 2/1998 | Nakamura | ............. | F02D 21/08 123/305 |
| 6,354,264 B1 * | 3/2002 | Iwakiri | ................. | F02D 35/023 123/305 |
| 6,502,549 B1 * | 1/2003 | Hoshino | ............... | F02D 35/023 123/406.12 |
| 7,527,034 B2 | 5/2009 | Gaertner | | |
| 2007/0266933 A1 | 11/2007 | Tsuchiya et al. | | |
| 2007/0266993 A1 * | 11/2007 | Kettl | .................... | F02D 35/023 123/406.24 |
| 2013/0192561 A1 * | 8/2013 | Hasegawa | ............. | F02D 41/047 123/435 |
| 2015/0176513 A1 | 6/2015 | Lana et al. | | |
| 2016/0237923 A1 * | 8/2016 | Kitagawa | ................ | F02D 41/06 |
| 2016/0290307 A1 * | 10/2016 | Urano | ..................... | F02P 5/153 |
| 2017/0037808 A1 | 2/2017 | Sausner et al. | | |
| 2017/0058855 A1 * | 3/2017 | Nakamura | .............. | F02P 9/002 |
| 2017/0107953 A1 | 4/2017 | Weldon et al. | | |

FOREIGN PATENT DOCUMENTS

| | | | |
|---|---|---|---|
| DE | 3137390 | A1 | 4/1983 |
| DE | 19606835 | A1 | 9/1996 |
| DE | 10028886 | A1 | 12/2001 |
| DE | 102006023473 | B3 | 5/2007 |
| DE | 102011081212 | A1 | 2/2013 |
| DE | 102013223734 | A1 | 6/2015 |
| EP | 0485089 | A2 | 5/1992 |
| EP | 3521600 | A1 | 8/2019 |
| JP | H0719090 | B2 | 1/1995 |
| JP | H07166938 | A | 6/1995 |
| JP | H08232745 | A | 9/1996 |
| JP | 09228899 | A | 9/1997 |
| JP | 2001125933 | A | 5/2001 |
| JP | 2001152933 | A | 6/2001 |
| JP | 2006291795 | A | 10/2006 |
| JP | 2006522892 | A | 10/2006 |
| JP | 2018053845 | A | 4/2018 |

OTHER PUBLICATIONS

German Office Action dated May 18, 2016 for corresponding German Patent Application No. 10 2015 219 133.8.
Korean Office Action dated Feb. 10, 2019 for corresponding Korean Patent Application No. 10-2018-7009337.
Korean Notice of Allowance dated Jun. 28, 2019 for corresponding Korean Patent Application No. 10-2018-7009337.
Chinese First Office Action issued May 8, 2020 for the counterpart Chinese Patent Application No. 201680057474.7.

* cited by examiner

METHOD FOR OPERATING AN INTERNAL COMBUSTION ENGINE FOR A MOTOR VEHICLE, AND A SYSTEM FOR AN INTERNAL COMBUSTION ENGINE

CROSS REFERENCE TO RELATED APPLICATIONS

This application is a continuation of International application No. PCT/EP2016/072123, filed Sep. 19, 2016, which claims priority to German application No. 10 2015 219 133.8, filed on Oct. 2, 2015, each of which is hereby incorporated by reference herein in its entirety.

FIELD OF INVENTION

The invention relates to a method for operating an internal combustion engine for a motor vehicle and a system for an internal combustion engine.

BACKGROUND

Ever more stringent regulatory requirements relating to permissible pollutant emissions in motor vehicles in which internal combustion engines are arranged make it necessary to keep the pollutant emissions during the operation of the internal combustion engine as low as possible. This requires, inter alia, the internal combustion engine to be actuated in a beneficial fashion in order to keep low the consumption of fuel and the emission of pollutant components.

An important parameter which affects a combustion process of internal combustion engines is the exhaust gas recirculation rate, which specifies the magnitude of the proportion of exhaust gas which is fed back to the internal combustion engine for a subsequent combustion process. In order to influence the combustion process of the internal combustion engine in a beneficial way, precise determination of the exhaust gas recirculation rate is necessary.

SUMMARY

An object on which the invention is based is to provide a method for operating an internal combustion engine for a motor vehicle and a system for an internal combustion engine which are suitable for keeping low the consumption of fuel and the output of pollutant emissions.

According to a first aspect, a method for operating an internal combustion engine for a motor vehicle includes receiving measurement signals of a cylinder pressure sensor which are representative of a pressure in a cylinder of the internal combustion engine of the motor vehicle. The method also includes determining cylinder pressure fluctuations in the cylinder as a function of the received a measurement signals of the cylinder pressure sensor. The method also includes increasing an exhaust gas recirculation rate of the internal combustion engine as a function of the determined cylinder pressure fluctuations until a predefined limiting value of the cylinder pressure fluctuations is reached. In addition, the method includes determining an actual value of the exhaust gas recirculation rate if the predefined limiting value of the cylinder pressure fluctuations is reached, and storing the actual value as a setpoint value for the exhaust gas recirculation rate of the internal combustion engine.

By means of the described method it is possible to determine the exhaust gas recirculation rate of an internal combustion engine for a motor vehicle reliably and adapt it in a targeted fashion, in order to keep low the consumption of fuel and output of pollutant emissions of the internal combustion engine. For this purpose, the measurement signals of the cylinder pressure sensor are evaluated, in order to control a combustion cycle or combustion process of the internal combustion engine.

For example, a predefined value for the exhaust gas recirculation rate which has been determined on an engine test bench for different operating points of the internal combustion engine is stored in a data memory of a control unit of the motor vehicle. Such a pre-stored value for the exhaust gas recirculation rate has been determined, for example, as a function of a rotational speed, an applied load and an engine temperature and serves as a predefined setpoint value for a driving operation of the motor vehicle. In this context, the predefined setpoint value for the exhaust gas recirculation rate has been determined, for example, by taking into account a minimum consumption of fuel with tolerable cylinder pressure fluctuations in a high-pressure phase of the internal combustion engine. However, such a predefined setpoint value may differ from an optimum value for the exhaust gas recirculation rate in an actual driving operation of the motor vehicle, in order to achieve the lowest possible consumption of fuel and lowest possible output of pollutant emissions.

By means of the described method, the exhaust gas recirculation rate is monitored on the basis of the received measurement signals of the cylinder pressure sensor and the determined cylinder pressure fluctuations, with the result that a beneficial adaptation may be carried out of a previously stored predefined setpoint value which may have advantageous effects on a combustion process of the internal combustion engine. The cylinder pressure fluctuations represents cyclical average pressure fluctuations which occur in a cylinder of the internal combustion engine during operation, and make it possible to draw conclusions about the combustion process.

The increased recirculation of exhaust gas in accordance with the increasing of the exhaust gas recirculation rate has the effect of reducing consumption of the required fuel for the internal combustion engine. However, it is necessary here to monitor the cylinder pressure fluctuations by, for example, acquiring measurement signals of the cylinder pressure sensor on an ongoing basis, continuously or at predefined time intervals. The increasing of the exhaust gas recirculation rate beyond a certain value entails an increase in the cylinder pressure fluctuations, which is caused, for example, by an excessively low admixture of fresh air. In order to ensure a controlled combustion process, it is therefore necessary that the cylinder pressure fluctuations do not exceed this value, which represents the predefined limiting value. The predefined limiting value accordingly may represent the maximum tolerable cylinder pressure fluctuations and maximum permissible exhaust gas recirculation rate for a reliable combustion process.

It is therefore possible to determine the exhaust gas recirculation rate by using the cylinder pressure sensor which is installed according to standard practice in internal combustion engines. Therefore, an already existing resource is used and there is no need for sensors which have to be additionally installed. In this way, with the described method, it is possible to implement a cost-effective and reliable way of determining the exhaust gas recirculation rate.

According to one development, the method includes receiving measurement signals of the cylinder pressure sensor which are representative of an intake pressure in an intake manifold of the internal combustion engine. An air mass which is sucked in in the intake manifold is determined as a function of the received measurement signals of the cylinder pressure sensor, and the exhaust gas recirculation rate of the internal combustion engine is controlled as a function of the determined air mass.

The described method is expanded to the effect that when the actual value of the exhaust gas recirculation rate is determined, the measurement signals of the cylinder pressure sensor are also evaluated to the effect that an air mass in the intake manifold is determined. Alternatively or additionally, it is also possible to arrange in the internal combustion engine an intake manifold pressure sensor which permits a sucked-in air mass to be determined, for example during an intake phase of the internal combustion engine. However, on the basis of the measurement signals of the cylinder pressure sensor, it is possible to determine both the sucked-in air mass and the proportion of fresh air and exhaust gas contained therein in the cylinder. The determination of the actual value of the exhaust gas recirculation rate may therefore be carried out solely by means of the cylinder pressure sensor.

According to one development, the method includes determining a knocking intensity as a function of the received measurement signals of the cylinder pressure sensor. Alternatively or additionally, measurement signals of a knocking sensor may be received which are representative of knocking of the combustion process, and the knocking intensity may be determined as a function of the received measurement signals of the knocking sensor. An ignition angle of a crankshaft which is coupled to a piston of the cylinder is adapted as a function of the determined knocking intensity. Consequently, the setpoint value of the exhaust gas recirculation rate is adapted as a function of the determined knocking intensity or as a function of the adaptation of the ignition angle.

The knocking intensity represents in this context an uncontrolled combustion behaviour of residual air-fuel mixtures which have not yet been detected in a combustion process and which may, as high-frequency pressure fluctuations, give rise to acoustically perceptible knocking. Such high-frequency pressure fluctuations are superimposed, for example as deflections, on the cyclical average pressure fluctuations or the cylinder pressure fluctuations and may also be detected by means of the cylinder pressure sensor.

Such knocking provides information about the combustion process and a center of combustion and may influence the adaptation of the exhaust gas recirculation rate. In this context, the adaptation of the exhaust gas recirculation rate or the adaptation of the setpoint value of the exhaust gas recirculation rate denotes a further increase or decrease as a function of the determined knocking intensity. The previously determined actual value at the boundary of the cylinder pressure fluctuations, which actual value has been stored as a setpoint value for the exhaust gas reticulation rate, is, where appropriate, corrected and stored as a new setpoint value for the exhaust gas recirculation rate.

According to one development, the method includes determining a center of combustion as a function of the received measurement signals of the cylinder pressure sensor, and adapting the setpoint value of the exhaust gas recirculation rate as a function of the determined center of combustion.

According to one development, the method includes determining a combustion period as a function of the received measurement signals of the cylinder pressure sensor, and adapting the setpoint value of the exhaust gas recirculation rate as a function of the determined combustion period.

The center of combustion and the combustion period are further parameters which may affect a combustion process of the internal combustion engine and may influence the adaptation of the exhaust gas recirculation. They may be determined on the basis of the received measurement signals of the cylinder pressure sensor, and may have effects on an optimum or maximum tolerable exhaust gas recirculation rate and may permit a controlled combustion process with low consumption of fuel. In this context, the term center of combustion denotes a time at which 50% of the used mass of fuel has burned. The combustion period is a time period in which a predefined portion of the fuel is consumed, and it relates, for example, to a difference in angles between two angular positions of a crankshaft of the internal combustion engine which is coupled to a piston which is arranged in an axially movable fashion in the cylinder.

According to one development, the method includes adapting the setpoint value of the exhaust gas recirculation rate by controlling an ignition angle of a crankshaft of the internal combustion engine which is coupled to a piston of the cylinder.

Controlling the ignition angle denotes in this context a controlled change of the ignition angle and of the associated angular position of the crankshaft in deviation from a predefined basic ignition angle. The basic ignition angle and also the center of combustion have been determined, for example, as predefined reference values, such as the predefined setpoint value for the exhaust gas recirculation rate, for a respective operating point of the internal combustion engine on an engine test bench and stored in a control unit of the motor vehicle. Changing the ignition angle in deviation from the basic ignition angle affects the combustion process and may be used to influence the exhaust gas recirculation rate in a targeted fashion and to set it in a beneficial fashion in conjunction with the determined cylinder pressure fluctuations. The basic ignition angle specifies here the cylinder-specific earliest allowable angular position of the crankshaft up to which no knocking combustion takes place in the internal combustion engine. Formulated differently, the basic ignition angle may represent the ignition angle at which the center of combustion is at an optimum.

According to one development, the method includes receiving measurement signals of a knocking sensor which are representative of a knocking intensity of a cylinder, and adapting the exhaust gas recirculation rate as a function of the received measurement signals of the knocking sensor.

This development of the method permits cylinder pressure fluctuations to be determined and the exhaust gas recirculation rate to be adapted, even if not every cylinder has a cylinder pressure sensor or just one cylinder pressure sensor is arranged in the internal combustion engine. The cylinder pressure sensor is advantageously arranged in that cylinder of the internal combustion engine which has the largest sensitivity to cylinder pressure fluctuations. By means of the knocking sensor, a tendency to knock is monitored at least in the cylinders which do not have a cylinder pressure sensor assigned to them. In addition, a segment time of the respective cylinders is measured and, if appropriate, is corrected and has sensor-wheel errors or encoder-wheel errors removed from it, and it is compared with that of the cylinder which has a cylinder pressure sensor. In this way, the segment time of a respective cylinder may be converted into cylinder-specific cylinder pressure fluctuations. In the further course of the process, the exhaust gas recirculation rate may be increased as a function of the cylinder pressure fluctuations which are determined in this way and/or the setpoint value for the exhaust gas recirculation rate may be adapted.

According to a second aspect of the invention, a system for an internal combustion engine includes a device which is configured to carry out one of the methods as described above, and a cylinder pressure sensor which is arranged in the internal combustion engine of the motor vehicle and whose measurement signals are representative of a pressure in the cylinder of the internal combustion engine.

Such a system describes a way of carrying out one of the methods described above in conjunction with the cylinder pressure sensor. For example, executable instructions permitting one of the described methods to be carried out are stored in a data memory of a control unit of the motor vehicle.

BRIEF DESCRIPTION OF THE DRAWINGS

Example embodiments of the invention are explained in more detail hereunder by means of the schematic drawings. In the drawings.

DETAILED DESCRIPTION

Elements with the same design or function are characterized by the same reference symbols in all the figures.

Figure 1:
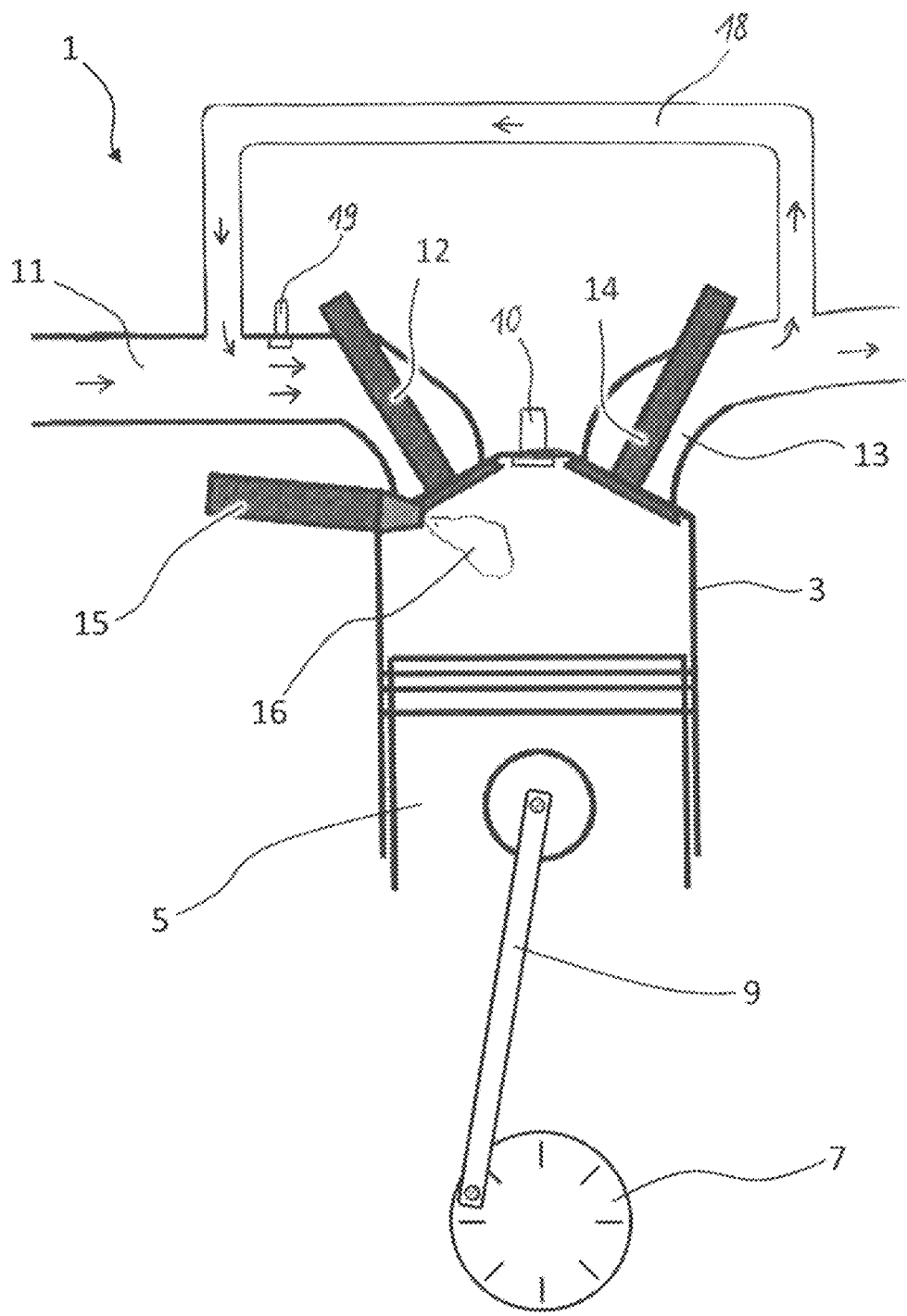
FIG. 1 shows an example embodiment of an injection system.

FIG. 1 shows a schematic illustration of an example embodiment of a system 1 which represents essentially a part of an internal combustion engine of a motor vehicle. The system 1 serves to inject or blow fuel 16 into a combustion chamber 4 of a cylinder 3 of the internal combustion engine. FIG. 1 illustrates just one combustion chamber 4, but usually the internal combustion engine has a plurality of combustion chambers 4. These are configured in a manner corresponding to the combustion chamber 4 illustrated in FIG. 1.

An intake manifold 11 is coupled to the combustion chamber 4 in order to feed air into the combustion chamber 4. An exhaust pipe 13 is coupled to the combustion chamber 4 in order to discharge exhaust gases. Arranged on the intake manifold 11 is an inlet valve 12. The inlet valve 12 serves to control the quantity, or mass, of air which passes into the combustion chamber 4 through the intake manifold 11. With the inlet valve 12 open, air may pass from the intake manifold 11 into the combustion chamber 4. With the inlet valve 12 closed, a flow of air from the intake manifold 11 into the combustion chamber 4 is prevented as far as possible. An outlet valve 14 is arranged on the exhaust pipe 13 in order to control the discharging of the exhaust gas.

In addition, a recirculation line 18 is schematically illustrated, which recirculation line 18 feeds a predefined portion of the exhaust gases in the exhaust pipe 13 back to the intake manifold 11 for a further combustion cycle or combustion process of the internal combustion engine. By means of the recirculation line 18 it is possible to control an exhaust gas recirculation rate EGR which may have advantageous effects on the combustion process, in order to keep low the consumption V of fuel 16 and the emission of pollutants. The recirculation line 18 is to be considered a component of the internal combustion engine in this context.

An injection valve 15 is arranged in order to inject the fuel 16 into the combustion chamber 4. In particular, it is possible to use the injection valve 15 to inject a predefined quantity of fuel 16, which is specified, for example, by a device. The device is, for example, part of an engine controller of the internal combustion engine.

A piston 5 is arranged in the combustion chamber 4. The piston 5 is movably arranged in the combustion chamber 4 of the cylinder 3 and during operation of the motor vehicle it drives a crankshaft 7 of the internal combustion engine, which crankshaft 7 is coupled to the piston 5 by means of a connecting rod 9. During a downward movement of the piston 5, fresh air and exhaust gases are drawn into the combustion chamber 4 of the cylinder 3 via an intake tract having the intake manifold 11. During a working cycle of the internal combustion engine, a mixture of fresh air, exhaust gases and fuel 16 is ignited in the combustion chamber 4 and a controlled explosion is initiated. As a result of the explosion, the piston 5 is driven down again. In the process, a torque is transmitted to the crankshaft 7 of the internal combustion engine.

Arranged at an axial end of the cylinder 3 is a cylinder pressure sensor 10 by means of which a pressure in the combustion chamber 4 of the internal combustion engine may be monitored. The measurement signals of the cylinder pressure sensor 10 may be evaluated in a method according to the flow diagram illustrated in FIG. 3, and permit a setpoint value S_EGR for the exhaust gas recirculation rate EGR to be determined and adapted, in order to permit a beneficial combustion process. In this context, there are relationships between the exhaust gas recirculation rate EGR and further parameters which influence the combustion process of the internal combustion engine. Qualitative dependences of such relationships are illustrated in the following FIGS. 2A-2C.

Figure 2A:
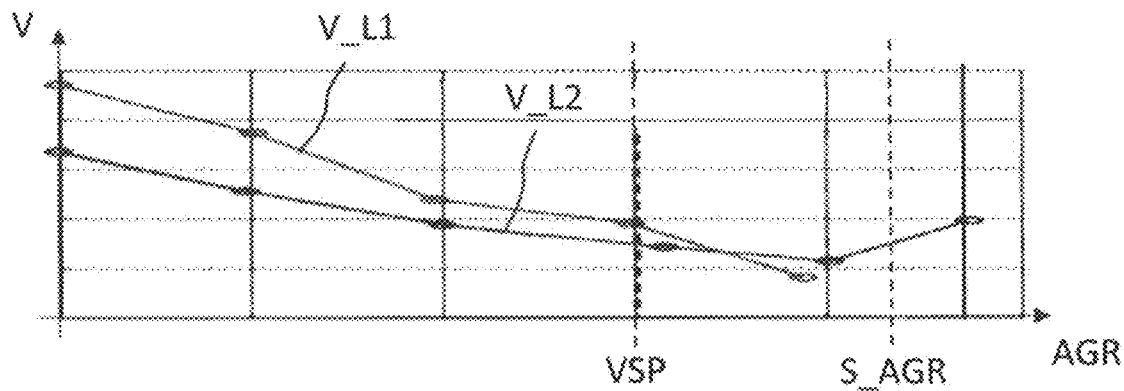
FIG. 2A shows a qualitative profile of the fuel consumption of an internal combustion engine as a function of an exhaust gas recirculation rate.

FIG. 2A shows the example qualitative consumption V of fuel 16 of the internal combustion engine of the motor vehicle as a function of the exhaust gas recirculation rate EGR. Two profiles V_L1 and V_L2 for various operating points of the internal combustion engine, which represent, for example, the consumption V for different rotational speeds, applied loads and/or engine temperatures, are illustrated. On the basis of the two profiles V_L1 and V_L2 it is possible to detect that the consumption V of fuel 16 drops when the exhaust gas recirculation rate EGR increases.

In addition, FIG. 2A shows a center of combustion VSP and a setpoint value S_EGR of the exhaust gas recirculation rate at different positions of the axis of the exhaust gas recirculation rate EGR which may have beneficial effects on the combustion process of the internal combustion engine. For example, the center of combustion VSP and a predefined setpoint value for the exhaust gas recirculation rate EGR have been determined as a setpoint value S_EGR on an engine test bench and have been stored in a control unit of the motor vehicle.

Figure 2B:
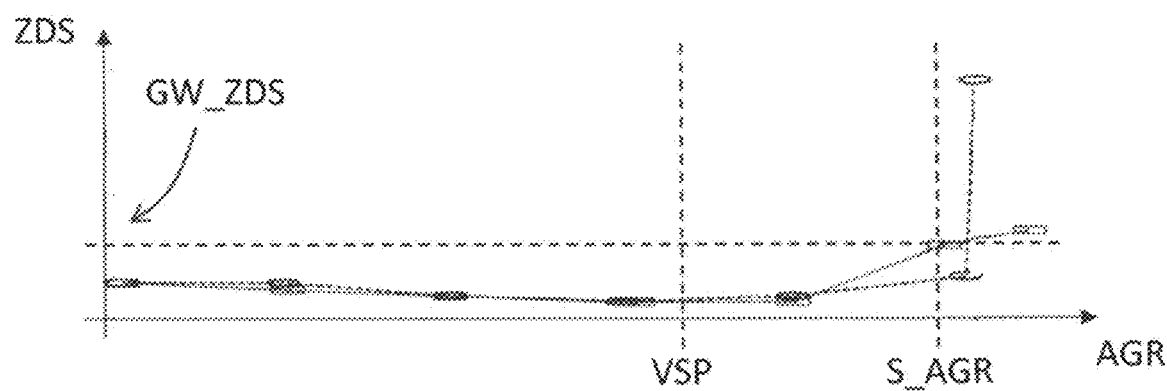
FIG. 2B shows a qualitative profile of cylinder pressure fluctuations in a cylinder of the internal combustion engine as a function of the exhaust gas recirculation rate.

FIG. 2B shows an example qualitative profile of cylinder pressure fluctuations ZDS during operation of the internal combustion engine as a function of the exhaust gas recirculation rate EGR. The cylinder pressure fluctuations ZDS have been determined, for example, within the scope of a method according to FIG. 3 as a function of the measurement signals of the cylinder pressure sensor. The illustrated profiles relate, in an analogous way to the profiles V_L1 and V_L2 illustrated in FIG. 2A, to different operating points of the internal combustion engine.

It may be seen that the cylinder pressure fluctuations ZDS initially remain essentially constant or even decrease slightly in the case of rising exhaust gas recirculation rates EGR. However, if the exhaust gas recirculation rate EGR increases further, the cylinder pressure fluctuations ZDS increase significantly and have a disadvantageous effect on the combustion process of the internal combustion engine. This significant increase in the cylinder pressure fluctuations ZDS may represent a limiting value of the still tolerable cylinder pressure fluctuations ZDS and of the maximum possible exhaust gas recirculation rate EGR which still permits a stable and reliable combustion process.

In FIG. 2B, this limiting value is denoted by GW_ZDS, and is exceeded, for example, in the case of an exhaust gas recirculation rate of 26%. At an engine test bench, for example, a works setting for the exhaust gas recirculation rate EGR of 23% was stored as a predefined setpoint value in a data memory of a control unit of the motor vehicle. From the determined cylinder pressure fluctuations ZDS according to FIG. 2B, it is apparent that it is beneficial to store a setpoint value S_EGR of the exhaust gas recirculation rate EGR with, for example, 25%, in order to reduce the consumption V of fuel 16 and set a certain safety interval from the limiting value GW_ZDS of the cylinder pressure fluctuations ZDS and the associated maximum acceptable exhaust gas recirculation rate EGR of 26%. In this way, by means of a method for operating the motor vehicle which is explained by way of example with reference to the following FIG. 3, the exhaust gas recirculation rate EGR is determined and adapted in a targeted fashion as a function of the measurement signals of the cylinder pressure cylinder 10 and of the cylinder pressure fluctuations ZDS determined therefrom, in order to influence the combustion process of the internal combustion engine in a controlled fashion and to improve it in respect of reduced consumption V of fuel 16 and reduced pollutant emissions.

Figure 2C:
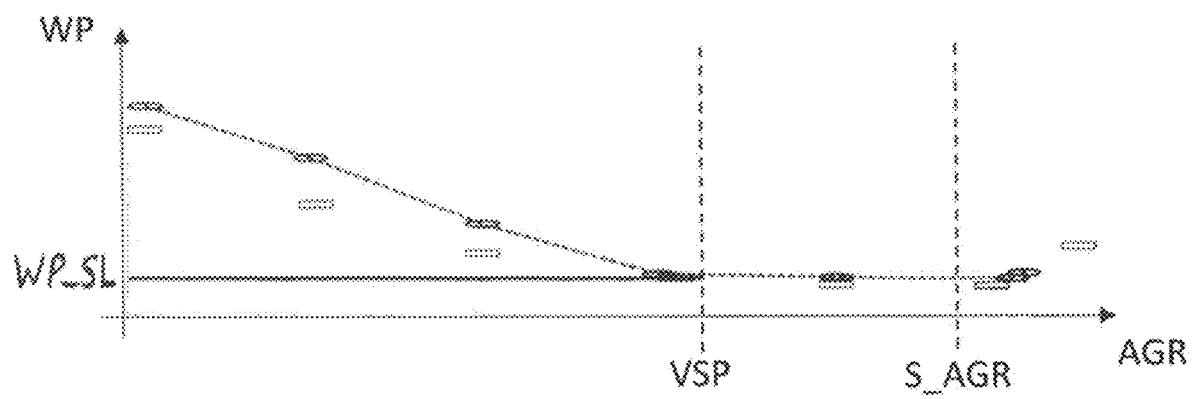
FIG. 2C shows a qualitative profile of an angular position of a center of gravity of the internal combustion engine as a function of the exhaust gas recirculation rate.

FIG. 2C shows an example qualitative profile of an angular position WP of a center of gravity of the internal combustion engine as a function of the exhaust gas recirculation rate EGR. In FIG. 2C, an angular position WP_SL for an optimum center of gravity on the axis of the angular position WP is also shown, which indicates, for example, a beneficial position or an advantageous time of the ignition in the cylinder 3. From this relationship it is apparent that the position of an ignition angle with respect to the angular position WP of the crankshaft 7 may also affect the exhaust gas recirculation rate EGR. By changing the ignition angle and the angular position WP_SL of the center of gravity it is possible to control the exhaust gas recirculation rate EGR to a certain extent. Further parameters which may influence the exhaust gas recirculation rate EGR and the maximum permissible setpoint value S_EGR for the exhaust gas recirculation rate are a knocking intensity, a combustion period and the center of combustion VSP of the internal combustion engine, with the result that the exhaust gas recirculation rate EGR may be determined and advantageously adapted as a function of these and, if appropriate, further parameters as well.

Figure 3:
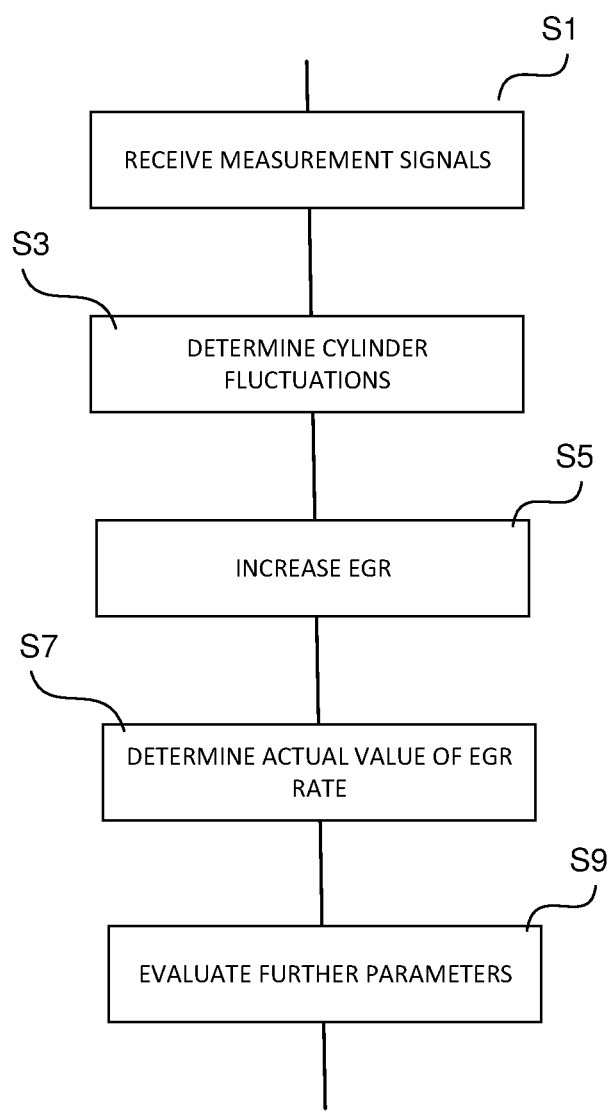
FIG. 3 shows a flow diagram of a method for operating the internal combustion engine.

FIG. 3 shows an example flow diagram of a method for operating the motor vehicle by means of which the exhaust gas recirculation rate EGR may be reliably determined and a predefined setpoint value may be adapted in a targeted fashion, in order to keep low the consumption V of fuel 16 and an output of pollutant emissions of the internal combustion engine.

For this purpose, in a step S1, measurement signals of the cylinder pressure sensor 10 which are representative of a pressure in a respective cylinder 3 of the internal combustion engine of the motor vehicle are received.

In a further step S3, cylinder pressure fluctuations ZDS are determined as a function of the received measurement signals of the cylinder pressure sensor 10, and for example the profile illustrated in FIG. 2B is determined.

In a further step S5, the exhaust gas recirculation rate EGR is increased until the predefined limiting value GW_ZDS of the cylinder pressure fluctuations ZDS is reached. During the increase in the exhaust gas recirculation rate EGR, the cylinder pressure fluctuations ZDS are, for example, continuously determined and monitored, in order to ensure a reliable and controlled increase in the exhaust gas recirculation rate EGR.

If the predefined limiting value GW_ZDS of the cylinder pressure fluctuations ZDS is reached, in a further step S7 an actual value of the exhaust gas recirculation rate EGR is determined.

The determined actual value is saved as a setpoint value S_EGR of the exhaust gas recirculation rate EGR and stored, for example, in a control unit of the motor vehicle. The stored setpoint value S_EGR may be used for subsequent combustion processes for operating the internal combustion engine. In this way, a previously stored predefined setpoint value may be checked and, if appropriate, adapted in order to improve further the combustion process of the internal combustion engine.

In a further step S9, for example, further parameters which may influence the exhaust gas recirculation rate EGR are evaluated. For example, measurement signals of an intake manifold pressure sensor 19, which is arranged in the recirculation line or the intake manifold 11, are also included in the determination and the adaptation of the exhaust gas recirculation rate EGR (FIG. 1). By means of the intake manifold pressure sensor 19 it is possible to determine an air mass which is sucked in in the intake manifold 11. However, the sucked-in air mass may also be determined on the basis of the measurement signals of the cylinder pressure sensor 10 which functions as an intake manifold pressure sensor in an intake phase of the internal combustion engine. In addition, the portion of fresh air and exhaust gas in the sucked-in air mass and therefore the actual value of the exhaust gas recirculation rate EGR may be determined by means of the cylinder pressure sensor 10.

The exhaust gas recirculation rate EGR may be determined, adapted or controlled as a function of the received measurement signals of the cylinder pressure sensor 10 and of the intake manifold pressure sensor 19. Alternatively or additionally, a knocking intensity, a combustion period and the center of combustion VSP are determined and also included in the determination and adaptation of the exhaust gas recirculation rate EGR. A previously determined and saved setpoint value S_EGR of the exhaust gas recirculation rate EGR may in this way be corrected and adapted further in order to implement a reliable and beneficial combustion process of the internal combustion engine.

For example, the method for operating the internal combustion engine and the motor vehicle may also be carried out as follows, in order to determine the exhaust gas recirculation rate reliably and adapt it in a controlled fashion.

In one example case of a high load applied to the internal combustion engine, it is advantageous to increase the exhaust gas recirculation rate EGR, in order to reduce the consumption V of fuel 16, until an optimum center of combustion VSP, which occurs, for example, at an ignition angle of 8° of the crankshaft 7 after the top dead center of the piston 5, is reached. It is to be noted here that the cylinder pressure fluctuations ZDS do not exceed the maximum permitted limiting value GW_ZDS.

In the further course of the process, the cylinder pressure fluctuations ZDS, the knocking intensity, the center of combustion VSP and/or the combustion period are determined by means of the cylinder pressure sensor 10. If, for example, the knocking intensity at a respective operating point of the internal combustion engine exceeds a predefined threshold value, the ignition angle is adapted by means of a knocking controller in that the angle is adjusted in the retarded direction, for example, for the respective cylinder 3.

"Adjustment in the retarded direction" of the ignition angle or of the angular position WP of the crankshaft 7 denotes in this context shifting of a predefined angular position WP of the ignition point of the combustion process. If, for example, the ignition point or ignition angle is specified with an angular position of 10° before the angular position WP of the top dead center, shifting of the angular position WP of the ignition point to, for example, 5° before the top dead center would permit "adjustment in the retarded direction" of the ignition angle to be implemented. Correspondingly, shifting of the angular position WP of the ignition point to, for example, 15° before the top dead center would be described by the term "adjustment in the early direction" of the ignition angle.

By adjusting the ignition angle in the retarded direction, the center of combustion VSP is also adjusted in the retarded direction, which gives rise to an increase in consumption. The exhaust gas recirculation rate EGR is then increased incrementally and as a result the knocking intensity is reduced. In this context, the cylinder pressure fluctuations ZDS are determined and monitored continuously. At the same time, the ignition angle is adjusted in the early direction again by means of the knocking control, until the applied basic ignition angle and/or the optimum center of combustion VSP are assumed again. If the cylinder pressure fluctuations ZDS of a respective cylinder 3 reach the respective maximum permitted limiting value GW_ZDS before the optimum center of combustion VSP or the basic ignition angle is reached, the increasing of the exhaust gas recirculation rate EGR is stopped and the instantaneous value of the exhaust gas recirculation rate EGR is determined as the actual value. In the further course of the process, this actual value is used as a setpoint value S_EGR for the respective operating point of the internal combustion engine, and as a result the consumption V of fuel 16 and the emission of pollutants of the internal combustion engine may be optimized.

If, during operation of the motor vehicle, the cylinder pressure fluctuations ZDS at a respective operating point of the internal combustion engine exceed the predefined limiting value GW_ZDS again, for example owing to increased moisture, the exhaust gas recirculation rate EGR is reduced again until the cylinder pressure fluctuations ZS undershoot the limiting value GW_ZDS again.

If the cylinder pressure fluctuations ZDS clearly undershoot the permitted limiting value GW_ZDS or if the knocking intensity of the combustion process is increased, for example owing to a reduction in moisture, the exhaust gas recirculation rate EGR is increased again until the limiting value GW_ZDS of the cylinder pressure fluctuations ZDS is reached.

In this way, the consumption V of fuel 16 of the internal combustion engine and the emission of pollutants is adapted and may be optimized on an ongoing basis by means of the described method, and a beneficial way of actuating the motor vehicle is implemented.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

LIST OF REFERENCE SIGNS

1 System
3 Cylinder
4 Combustion chamber
5 Piston
7 Crankshaft
9 Connecting rod
10 Cylinder pressure sensor
11 Intake manifold for air
12 Inlet valve
13 Exhaust pipe for exhaust gases
14 Outlet valve
15 Injection valve
16 Fuel
18 Recirculation line
19 Intake manifold pressure sensor
EGR Exhaust gas recirculation rate
GW_ZDS Limiting value for cylinder pressure fluctuations
S_EGR Setpoint value for exhaust gas recirculation rate
V Consumption
V_L1 Profile of load 1
V_L2 Profile of load 2
VSP Consumption center
WP Angular position of a crankshaft of a cylinder
WP_SL Angular position of the centre of gravity
ZDS Cylinder pressure fluctuations

The invention claimed is:

1. A method for operating an internal combustion engine for a motor vehicle, comprising:
   receiving measurement signals of a cylinder pressure sensor which are representative of a pressure in a cylinder of the internal combustion engine,
   determining cylinder pressure fluctuations in the cylinder of the internal combustion engine as a function of the received measurement signals of the cylinder pressure sensor,
   increasing an exhaust gas recirculation rate of the internal combustion engine as a function of the determined cylinder pressure fluctuations until a predefined limiting value of the cylinder pressure fluctuations is reached,
   determining an actual value of the exhaust gas recirculation rate if the predefined limiting value of the cylinder pressure fluctuations is reached, and storing the determined actual value as a setpoint value for the exhaust gas recirculation rate of the internal combustion engine,
   determining a center of combustion as a function of the received measurement signals of the cylinder pressure sensor, and adapting the setpoint value of the exhaust gas recirculation rate as a function of the determined center of combustion.

2. The method as claimed in claim 1, further comprising:
receiving measurement signals of the cylinder pressure sensor which are representative of an intake pressure in an intake manifold of the internal combustion engine,
determining an air mass, sucked in in the intake manifold, as a function of the received measurement signals of the cylinder pressure sensor that are representative of the intake pressure in the intake manifold, and
controlling the exhaust gas recirculation rate of the internal combustion engine as a function of the determined air mass.

3. The method as claimed in claim 2, further comprising:
determining a knocking intensity as a function of the received measurement signals of the cylinder pressure sensor or as a function of measurement signals of a knocking sensor,
adapting an ignition angle of a crankshaft of the internal combustion engine which is coupled to a piston in the cylinder, as a function of the determined knocking intensity, and
adapting the setpoint value of the exhaust gas recirculation rate as a function of the adaptation of the ignition angle.

4. The method as claimed in claim 1, further comprising:
determining a combustion period as a function of the received measurement signals of the cylinder pressure sensor, and
adapting the setpoint value of the exhaust gas recirculation rate as a function of the determined combustion period.

5. The method as claimed in claim 1, further comprising adapting the setpoint value of the exhaust gas recirculation rate by controlling an ignition angle of a crankshaft of the internal combustion engine which is coupled to a piston in the cylinder.

6. The method as claimed in claim 1, further comprising:
receiving measurement signals of a knocking sensor which are representative of a knocking intensity of a respective cylinder, and
adapting the setpoint value of the exhaust gas recirculation rate as a function of the received measurement signals of the knocking sensor.

7. The method as claimed in claim 1, further comprising:
determining a knocking intensity as a function of the received measurement signals of the cylinder pressure sensor or as a function of measurement signals of a knocking sensor,
adapting an ignition angle of a crankshaft of the internal combustion engine which is coupled to a piston in the cylinder, as a function of the determined knocking intensity, and
adapting the setpoint value of the exhaust gas recirculation rate as a function of the adaptation of the ignition angle.

8. The method of claim 1, wherein increasing the exhaust gas recirculation rate of the internal combustion engine comprises increasing the exhaust gas recirculation rate until the center of combustion occurs.

9. A system for an internal combustion engine having a cylinder, comprising:
a cylinder pressure sensor which is arranged in the internal combustion engine of the motor vehicle and whose measurement signals are representative of a pressure in the cylinder of the internal combustion engine; and
a device and memory coupled thereto, the device being configured to:
receive measurement signals of the cylinder pressure sensor which are representative of a pressure in a cylinder of the internal combustion engine,
determining cylinder pressure fluctuations in the cylinder of the internal combustion engine as a function of the received measurement signals of the cylinder pressure sensor,
increasing an exhaust gas recirculation rate of the internal combustion engine as a function of the determined cylinder pressure fluctuations until a predefined limiting value of the cylinder pressure fluctuations is reached,
determining an actual value of the exhaust gas recirculation rate if the predefined limiting value of the cylinder pressure fluctuations is reached, and storing the determined actual value in the memory as a setpoint value for the exhaust gas recirculation rate of the internal combustion engine,
determine a center of combustion as a function of the received measurement signals of the cylinder pressure sensor, and
adapt the setpoint value of the exhaust gas recirculation rate as a function of the determined center of combustion.

10. The system as claimed in claim 9, wherein the device is further configured to:
receive measurement signals of the cylinder pressure sensor which are representative of an intake pressure in an intake manifold of the internal combustion engine,
determine an air mass, sucked in in the intake manifold, as a function of the received measurement signals of the cylinder pressure sensor that are representative of the intake pressure in the intake manifold, and
control the exhaust gas recirculation rate of the internal combustion engine as a function of the determined air mass.

11. The system as claimed in claim 9, wherein the device is further configured to
determine a knocking intensity as a function of the received measurement signals of the cylinder pressure sensor or as a function of measurement signals of a knocking sensor,
adapt an ignition angle of a crankshaft of the internal combustion engine which is coupled to a piston in the cylinder, as a function of the determined knocking intensity, and
adapt the setpoint value of the exhaust gas recirculation rate as a function of the adaptation of the ignition angle.

12. The system as claimed in claim 9, wherein the device is further configured to
determine a combustion period as a function of the received measurement signals of the cylinder pressure sensor, and
adapt the setpoint value of the exhaust gas recirculation rate as a function of the determined combustion period.

13. The system as claimed in claim 9, wherein the device is further configured to adapt the setpoint value of the exhaust gas recirculation rate by controlling an ignition angle of a crankshaft of the internal combustion engine which is coupled to a piston in the cylinder.

14. The system as claimed in claim 9, wherein the device is further configured to receive measurement signals of a knocking sensor which are representative of a knocking intensity of a respective cylinder, and adapt the setpoint value of the exhaust gas recirculation rate as a function of the received measurement signals of the knocking sensor.

\* \* \* \* \*